W. BRYSON.
Device for Setting, Filing and Jointing Saws.
No. 162,796. Patented May 4, 1875.
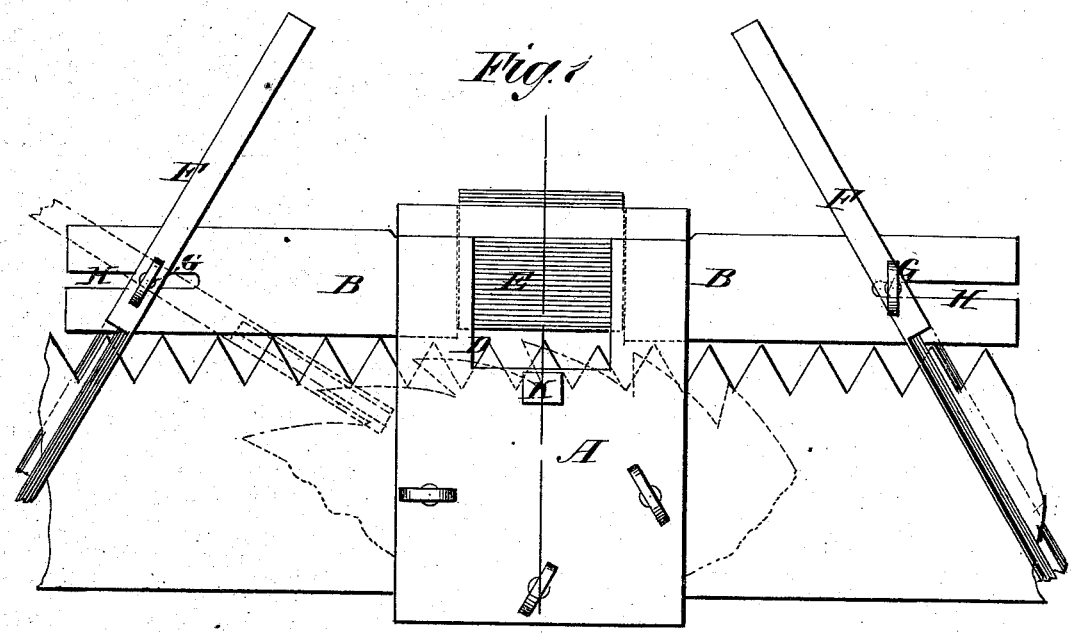
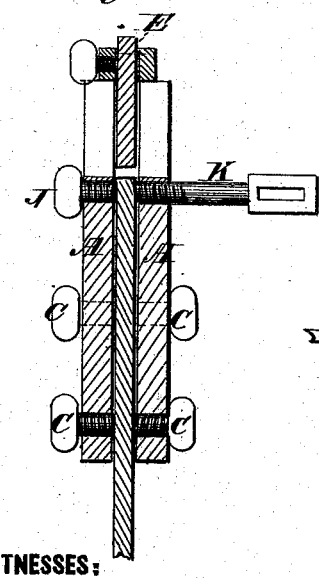
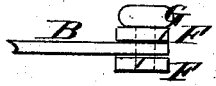
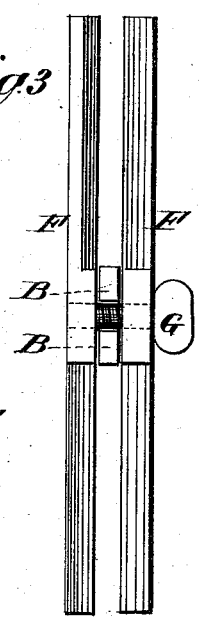

UNITED STATES PATENT OFFICE.

WILLIAM BRYSON, OF UNITY, WISCONSIN.

IMPROVEMENT IN DEVICES FOR SETTING, FILING, AND JOINTING SAWS.

Specification forming part of Letters Patent No. 162,796, dated May 4, 1875; application filed March 13, 1875.

*To all whom it may concern:*

Be it known that I, WILLIAM BRYSON, of Unity, in the county of Clark and State of Wisconsin, have invented a new and Improved Saw-Set and Filing-Gage, of which the following is a specification:

My invention consists of a couple of blocks and a straight-edge, contrived with the latter fastened between the former, so that they clamp on the saw by set-screws, while the straight-edge rests on the points of the teeth of a straight saw to gage them as to length, and in the top of the block is a filing-notch and an adjustable gage for the file for jointing the teeth, and on each end of the straight-edge are adjustable, detachable, and reversible gages, by which to gage the file for beveling and squaring the edges of the teeth. The set consists of an adjustable die in one of the blocks and a screw-presser in the other by which to bind the teeth.

Figure 1 is a side elevation of my improved saw-set and filing-gage. Fig. 2 is a section on the line $x\ x$ of Fig. 1. Fig. 3 is an end elevation, and Fig. 4 is a top view of a part of the straight-edge and one of the filing-gages.

Similar letters of reference indicate corresponding parts.

A represents the two blocks, and B the straight edge, which are fastened together so as to fit on the edge of the saw, as represented in Figs. 1 and 2, and be fastened by the set-screws C. The blocks A have a notch, D, in which to run the file for jointing the teeth, and in the notch is an adjustable gage, E, by which to govern the file in jointing the teeth, the gage being governed by the straight-edge resting on the points of the teeth. F represents the adjustable, reversible, and detachable gages fixed on the straight-edge for guiding the file in filing the edges of the teeth. They consist of bars, preferably two, with sides beveled or square to the plane of the saw, according to the form of the teeth to be dressed, connected to the straight-edge by a clamping pivot-bolt, G, on which they can turn freely, and the bolts are arranged in slots H, so that they can be readily taken out and put in for shifting the gages, as may be wanted.

For a circular saw a curved bar adapted to the curvature of the saw will be substituted for the straight-edge, and it will probably be jointed to adjust to saws of different sizes.

The set consists of the adjustable screw-die J and the screw punch or presser K.

Having thus described my invention, I claim as new and desire to secure by Letters Patent—

The improved device for setting, filing and jointing saw-teeth, consisting of notched blocks A D A D, end-slotted edge B, jointing-gage E, adjustable gages F F, and set J K, all arranged substantially as shown and described.

WILLIAM BRYSON.

Witnesses:
 WM. T. HUTCHINSON,
 CULLEN AYERS.